(12) United States Patent
Shiraishi

(10) Patent No.: US 11,994,794 B2
(45) Date of Patent: *May 28, 2024

(54) OPTICAL ARRAY, OPTICAL APPARATUS, AND IMAGE FORMING APPARATUS

(71) Applicant: TOSHIBA TEC KABUSHIKI KAISHA, Tokyo (JP)

(72) Inventor: Takashi Shiraishi, Kawasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 540 days.

This patent is subject to a terminal disclaimer.

(21) Appl. No.: 17/240,997

(22) Filed: Apr. 26, 2021

(65) Prior Publication Data

US 2022/0019154 A1 Jan. 20, 2022

(30) Foreign Application Priority Data

Jul. 16, 2020 (JP) ................................ 2020-122218

(51) Int. Cl.
*G02B 5/00* (2006.01)
*G02B 17/08* (2006.01)
*G03B 5/00* (2021.01)
*G03G 15/04* (2006.01)

(52) U.S. Cl.
CPC .............. *G03B 5/00* (2013.01); *G02B 5/005* (2013.01); *G02B 17/086* (2013.01); *G03G 15/04036* (2013.01)

(58) Field of Classification Search
CPC .... G02B 17/08; G02B 17/002; G02B 17/086; G02B 3/005; G02B 5/005; G02B 5/10; G02B 19/0028; G02B 19/0066; G03G 15/04036; G03G 15/0435; H04N 1/0285; H04N 1/02865

See application file for complete search history.

(56) References Cited

U.S. PATENT DOCUMENTS

2016/0216634 A1   7/2016  Shiraishi
2018/0196242 A1*  7/2018  Maeda ................ G02B 6/0001
2019/0052768 A1   2/2019  Shiraishi

FOREIGN PATENT DOCUMENTS

JP   2018-194715 A   12/2018
JP   2019-032482 A   2/2019

OTHER PUBLICATIONS

Office Action dated Oct. 24, 2023, in corresponding Japanese Patent Application No. 2020-122218, 12 pages (with Translation).

* cited by examiner

*Primary Examiner* — Stephone B Allen
*Assistant Examiner* — Tamara Y. Washington
(74) *Attorney, Agent, or Firm* — Kim & Stewart LLP

(57) ABSTRACT

An optical array includes one or more optical elements each including an incident surface at which light is incident into the optical element, a first reflection surface at which the light passing through the incident surface is reflected, a second reflection surface at which the light reflected by the first reflection surface is reflected again, an emission surface at which the light from the second reflection surface exits the optical element, and a refractive surface at which light that passes through the first reflection surface is refracted away from the emission surface.

19 Claims, 8 Drawing Sheets

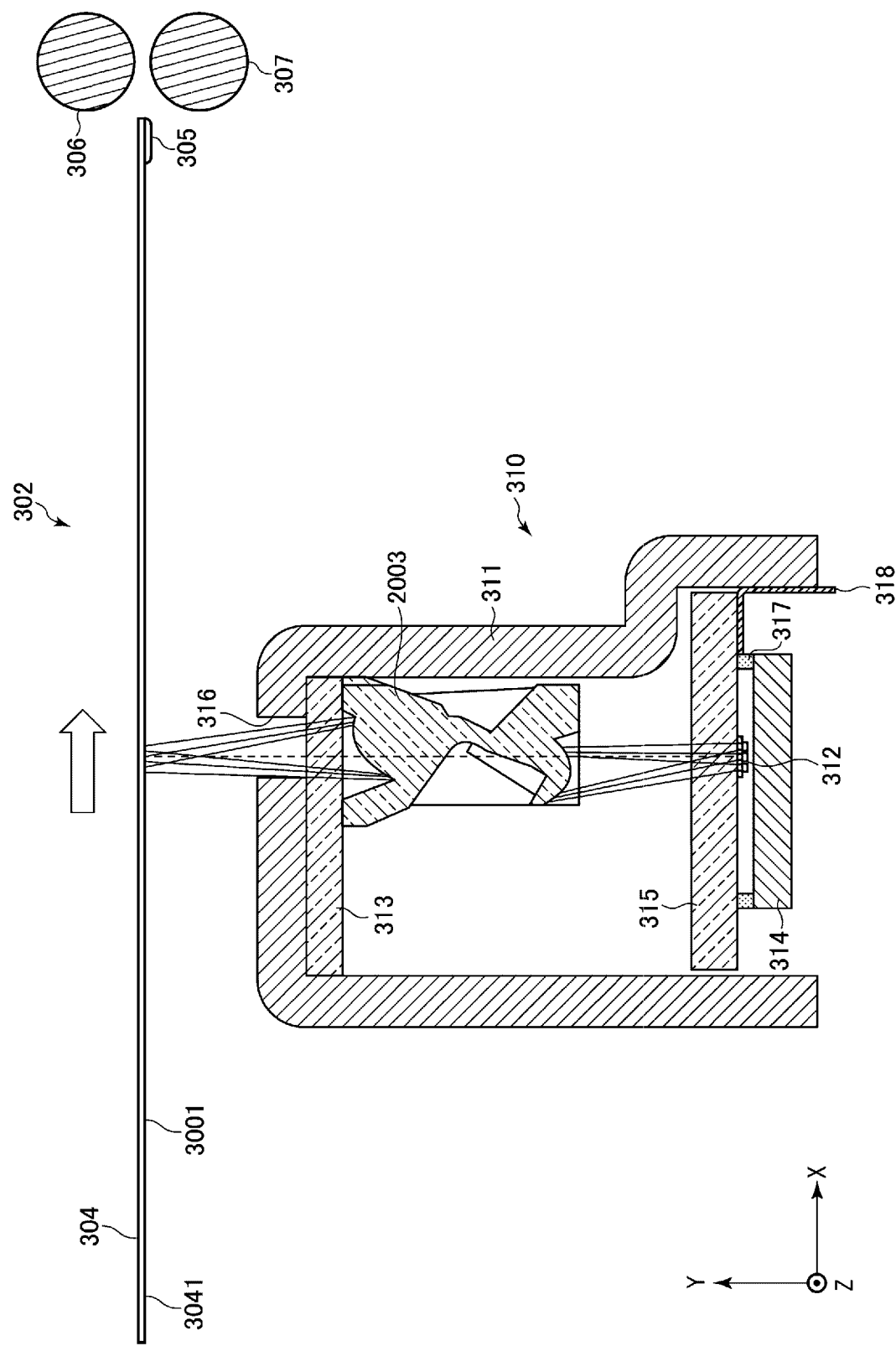

OPTICAL ARRAY, OPTICAL APPARATUS, AND IMAGE FORMING APPARATUS

CROSS-REFERENCE TO RELATED APPLICATION

This application is based upon and claims the benefit of priority from Japanese Patent Application No. 2020-122218, filed Jul. 16, 2020, the entire contents of which are incorporated herein by reference.

FIELD

Embodiments described herein relate generally to an optical array, an optical apparatus, and an image forming apparatus.

BACKGROUND

An image forming apparatus forms an image on an image surface using light emitted from light emitting elements arranged in a line. The image is formed on the image surface using an optical element array. In the optical element array, optical elements such as mirrors or the like are arranged in a line. The optical element array has a light shielding surface on which a light shielding layer is formed. However, light may still be transmitted through the light shielding surface and become inadvertent stray light. The stray light may affect image formation of the optical element array.

BRIEF DESCRIPTION OF THE DRAWINGS

FIG. 9 is a schematic diagram illustrating a printer.

DETAILED DESCRIPTION

Figure 1:
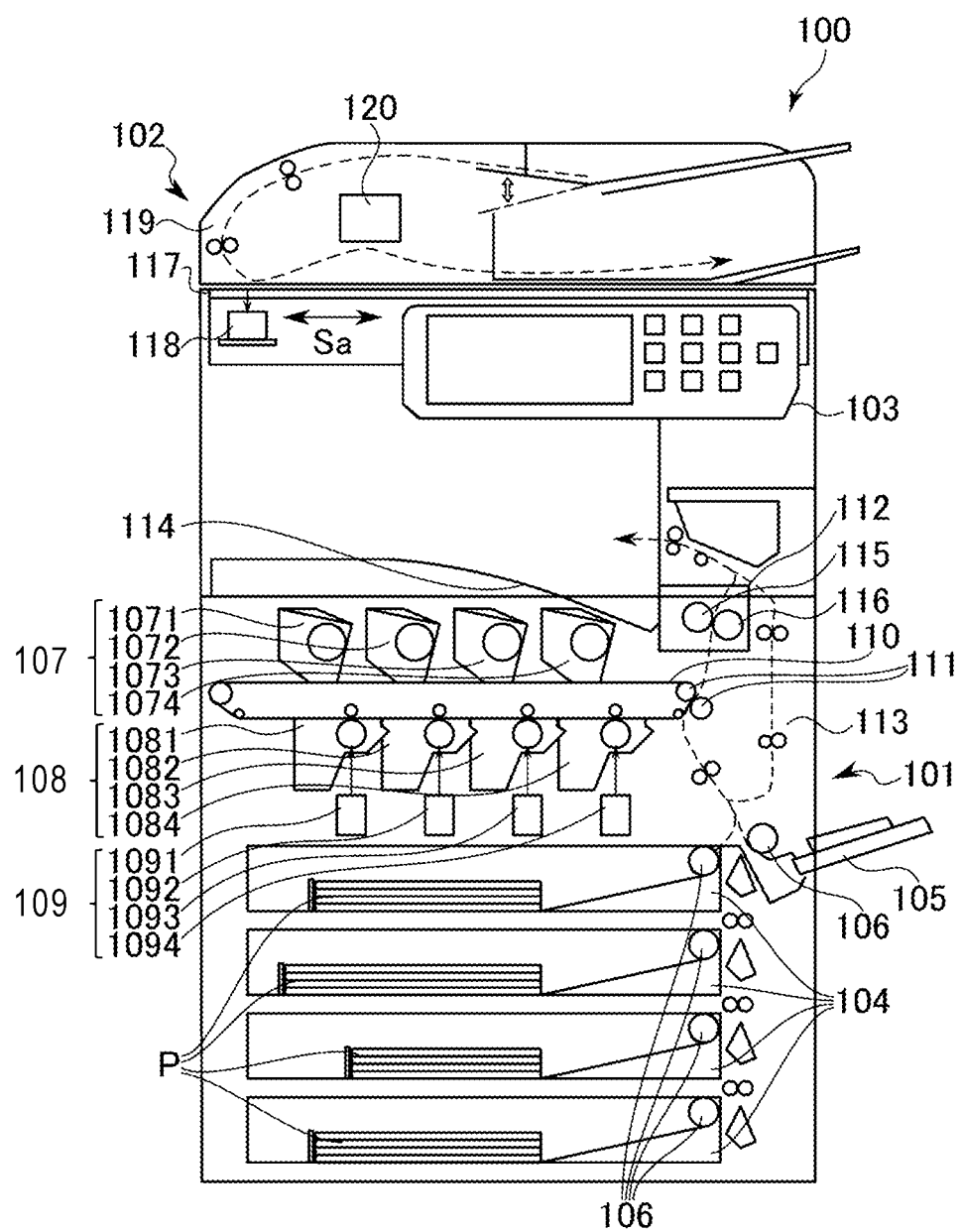
FIG. 1 is a diagram illustrating an image forming apparatus according to an embodiment.

Embodiments described herein provide an optical array, an optical apparatus, and an image forming apparatus that reduce the influence of stray light on image formation.

In general, according to one embodiment, an optical array includes one or more optical elements. Each of the optical elements includes an incident surface at which light enters the optical element, a first reflection surface at which the light passing through the incident surface is reflected, a second reflection surface at which the light reflected by the first reflection surface is reflected again, an emission surface at which the light from the second reflection surface exits the optical element, and a refractive surface at which light that passes through the first reflection surface from inside the optical element is refracted away from the emission surface.

Hereinafter, an image forming apparatus according to one or more embodiments will be described with reference to the drawings. In the drawings, the scale of each element or component may be changed for illustration purpose. In the drawings, certain components or aspects may be omitted for depictional simplicity. In drawings, the same reference sign is used for the same or substantial similar element in each drawing.

FIG. 1 is a diagram illustrating an image forming apparatus 100 according to an embodiment.

The image forming apparatus 100 is, for example, a multifunction peripheral (MFP), a copier, a printer, a facsimile, or the like. However, the image forming apparatus 100 will be particularly described as an MFP in the present example. The image forming apparatus 100 has a printing function, a scanning function, a copy function, a facsimile function, and the like. In the present context, a printing function is forming an image on a medium P or the like by using a printing material such as toner. The medium P is, for example, a sheet of paper or the like. A scanning function is a reading of an image from an original document or the like on which the image has been previously formed. A copy function is printing an image read from an original document or the like (e.g., by use of the scanning function) on the medium P by using the printing function. The image forming apparatus 100 includes a printer 101, a scanner 102, and an operation panel 103.

The printer 101 forms or prints an image on the medium P. For example, the printer 101 includes a paper feed tray 104, a manual feed tray 105, a paper feed roller 106, a toner cartridge 107, an image forming unit 108, a scanning head 109, a transfer belt 110, a secondary transfer roller 111, a fixing unit 112, a double-side unit 113, and a paper discharge tray 114.

The printer 101 is also referred to as the optical apparatus.

The paper feed tray 104 accommodates the medium P used for printing.

The manual feed tray 105 is a tray for manually feeding the medium P.

The paper feed roller 106 is rotated by a motor, thereby carrying out the medium P from the paper feed tray 104 or the manual feed tray 105.

The toner cartridge 107 stores a printing material, such as toner, to be supplied to the image forming unit 108. The image forming apparatus 100 includes one or more toner cartridges 107. For example, the image forming apparatus 100 includes, as illustrated in FIG. 1, four toner cartridges 107 (a toner cartridge 1071, a toner cartridge 1072, a toner cartridge 1073, and a toner cartridge 1074). The toner cartridge 1071, the toner cartridge 1072, the toner cartridge 1073, and the toner cartridge 1074 respectively store printing materials corresponding to colors of cyan, magenta, yellow, and black (CMYK). For example, the toner cartridge 1071 stores a yellow color printing material. The toner cartridge 1072 stores a magenta color printing material. The toner cartridge 1073 stores a cyan color printing material. The toner cartridge 1074 stores a black color printing material. The color of the printing material stored in a toner cartridge 107 is not limited to these CMYK colors, and may be other colors.

The image forming apparatus 100 includes one or more image forming units 108. For example, the image forming apparatus 100 includes, as illustrated in FIG. 1, four image forming units 108 (an image forming unit 1081, an image forming unit 1082, an image forming unit 1083, and an image forming unit 1084). The image forming unit 1081, the image forming unit 1082, the image forming unit 1083, and the image forming unit 1084 respectively form images with the printing materials corresponding to the colors of CMYK supplied from the toner cartridges 1071-1074. For example, the image forming unit 1081 forms an image with the yellow color printing material. The image forming unit 1082 forms an image with the magenta color printing material. The image forming unit 1083 forms an image with the cyan color printing material. The image forming unit 1084 forms an image with the black color printing material.

The image forming apparatus 100 includes one or more scanning heads 109. For example, the image forming apparatus 100 includes, as illustrated in FIG. 1, four scanning heads 109 (a scanning head 1091, a scanning head 1092, a scanning head 1093, and a scanning head 1094). Each of the scanning head 1091, the scanning head 1092, the scanning head 1093, and the scanning head 1094 forms an electrostatic latent image corresponding to respective CMYK color on a surface of a photosensitive drum 10801 corresponding to each color. For example, the scanning head 1091 forms an electrostatic latent image for the yellow color. The scanning head 1092 forms an electrostatic latent image for the magenta color. The scanning head 1093 forms an electrostatic latent image for the cyan color. The scanning head 1094 forms an electrostatic latent image for the black color. The scanning head 109 forms an electrostatic latent image on the surface of the photosensitive drum 10801 using a solid-state scanning system in this example.

Figure 2:
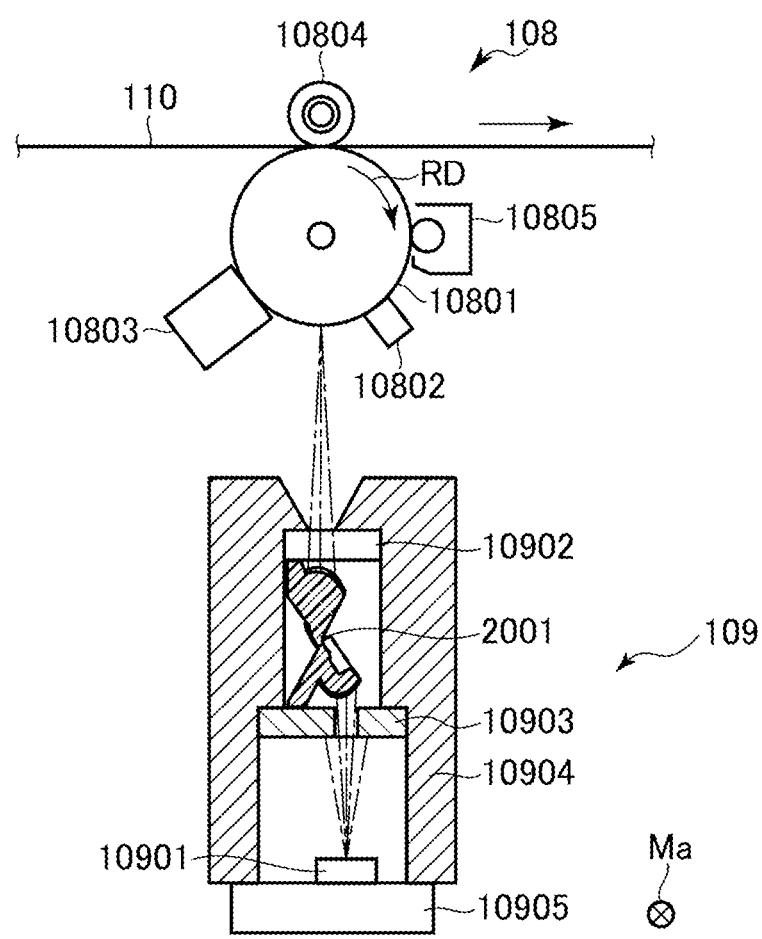
FIG. 2 is a diagram illustrating an image forming unit and a scanning head.

FIG. 2 is a diagram illustrating an image forming unit 108 and a scanning head 109.

The image forming unit 108 includes the photosensitive drum 10801, a charging unit 10802, a developing unit 10803, a primary transfer roller 10804, and a cleaner 10805.

Light emitted from the scanning head 109 hits the surface of the photosensitive drum 10801. As a result, the electrostatic latent image can be formed on the surface of the photosensitive drum 10801 by selective exposure.

The charging unit 10802 charges the surface of the photosensitive drum 10801 to a predetermined positive charge.

The developing unit 10803 supplies printing material (developer) from the toner cartridge to develop the electrostatic latent image that has been formed on the surface of the photosensitive drum 10801. As a result, an image formed by the printing material is formed on the surface of the photosensitive drum 10801.

A transfer voltage is applied between the primary transfer roller 10804 and the photosensitive drum 10801. As a result, the primary transfer roller 10804 transfers the image formed on the surface of the photosensitive drum 10801 to the transfer belt (this image transfer is referred to as a primary transfer).

The cleaner 10805 removes the printing material remaining on the surface of the photosensitive drum 10801.

The scanning head 109 includes an optical element array 2001, a light source 10901, a protective glass 10902, a light shielding body 10903, a housing 10904, and a substrate 10905.

The optical element array 2001 is an optical component to focus light emitted from the light source 10901 onto an image surface of the photosensitive drum 10801 having a predetermined area. The predetermined area is, for example, equal to a belt-shaped area that goes around a side peripheral surface of the photosensitive drum 10801 once. That is, the optical element array 2001 forms the electrostatic latent image on the image surface with light emitted from a plurality of light emitting elements.

In the light source 10901, for example, light emitting elements such as a light-emitting diode (LED), an organic electro-luminescence (EL) or an organic light-emitting diode (OLED), a fluorescent tube, a laser oscillator, or the like are arranged in one row or a plurality of rows. The light source 10901 emits light.

The protective glass 10902 is transparent glass, transparent resin, or the like that is provided between the optical element array 2001 and the photosensitive drum 10801. The protective glass 10902 protects the optical element array 2001. For example, the protective glass 10902 prevents the printing material, dust, or the like from adhering to the optical element array 2001.

The light shielding body 10903 is provided between the optical element array 2001 and the light source 10901. The light shielding body 10903 is, for example, a member whose surface is coated with a light shielding material. The light shielding body 10903 shields a part of the light emitted from the light emitting element provided in the light source 10901. For example, the light shielding body 10903 prevents light from the light emitting element that is off the optical axis by a predetermined distance or more from reaching the optical element array 2001.

The housing 10904 supports the light source 10901, the optical element array 2001, the protective glass 10902, the light shielding body 10903, and the substrate 10905. The housing 10904 blocks light that might be transmitted from the optical element array 2001 in unintended directions. That is, the housing 10904 acts as light shielding member that prevents stray light that might otherwise be incident on the photosensitive drum 10801 or the like.

The substrate 10905 is a circuit substrate (e.g., a printed circuit board or the like) on which the light source 10901, a driving circuit for driving the light source 10901, and the like are mounted.

Referring back to the description of FIG. 1, the transfer belt 110 is, for example, an endless belt, and can be rotated by the roller. The transfer belt 110 conveys the image transferred from each image forming unit 108 to the secondary transfer roller unit 111 by the rotation thereof.

The secondary transfer roller unit 111 includes two rollers facing each other. The secondary transfer roller unit 111 transfers (referred to as a secondary transfer) the toner image on the transfer belt 110 to the medium P passing between the pair of rollers of the secondary transfer rollers unit 111.

The fixing unit 112 heats and presses the medium P when toner image is transferred thereto. As a result, the image transferred to the medium P is fixed to the medium P. The fixing unit 112 includes, for example, a heating unit 115 and a pressure roller 116 facing each other.

The heating unit 115 is, for example, a roller provided with a heat source for heating the heating unit 115. The heat source is, for example, a heater. The roller heated by the heat source heats the medium P.

The pressure roller 116 presses the medium P passing between the pressure roller 116 and the heating unit 115.

The double-side unit 113 allows printing to be performed on a front and back surface of the medium P. For example, the double-side unit 113 inverts the front and back of the medium P by a switch back of the medium P using a roller or the like.

The paper discharge tray 114 is a tray to which the printed medium P is discharged.

The scanner 102 is an optical apparatus such as an optical reduction system including an imaging device such as a charge-coupled device (CCD) image sensor or the like. Alternatively, the scanner 102 is a contact image sensor (CIS) system including an imaging device such as a complementary metal-oxide-semiconductor (CMOS) image sensor or the like. Alternatively, the scanner 102 may be another well-known system. The scanner 102 reads an image from an original document. As an example, the scanner 102 includes an original document platen 117, a reading module 118, an original document feeder 119, and a back surface reading module 120.

The original document platen 117 is a plate or the like on which the original document can be placed. The original document platen 117 is, for example, a transparent glass or a transparent resin plate. Light reflected from the original document is transmitted through the original document platen 117, and then is incident on the reading module 118.

Figure 3:
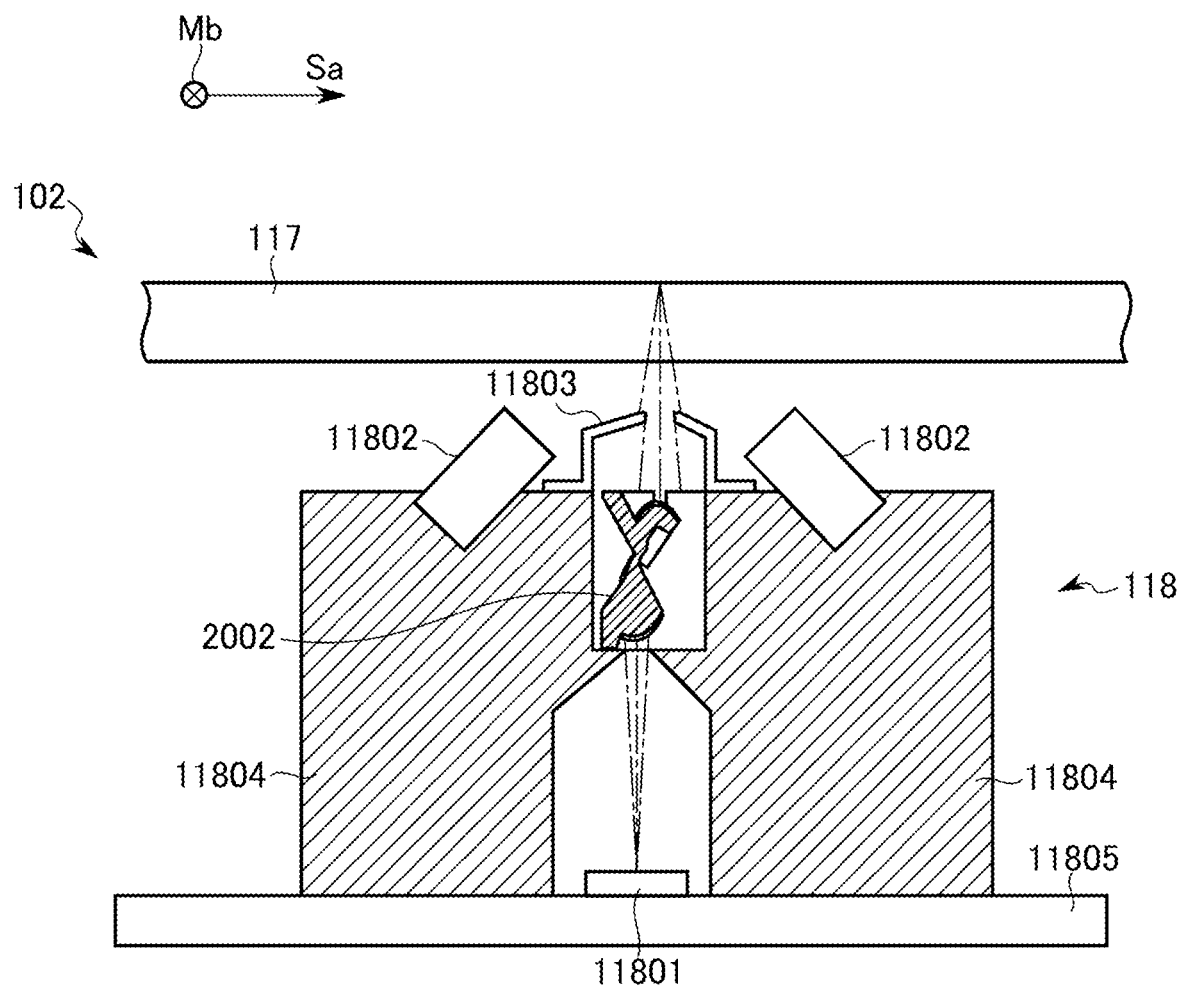
FIG. 3 is a diagram illustrating a reading module.

FIG. 3 is a diagram illustrating the reading module 118. The reading module 118 converts the incident light into a digital signal by the image sensor. As a result, the reading module 118 reads the image from a surface of the original document. The reading module 118 is movable along a sub-scanning direction Sa. As a result, the reading module 118 can read the image by scanning the surface of the original document. A main scanning direction Mb and the sub-scanning direction Sa are orthogonal to each other. The main scanning direction Mb and the sub-scanning direction Sa are parallel to an upper surface of the original document platen 117. The reading module 118 includes, as an example, an optical element array 2002, an image sensor 11801, an illumination unit 11802, a light shielding body 11803, a housing 11804, and a substrate 11805.

The optical element array 2002 has substantially the same configuration as that of the optical element array 2001 provided in the scanning head 109. However, in some examples, the optical element array 2002 may have a shape which is mirror image of the shape of the optical element array 2001. The optical element array 2002 can be mounted upside down from the optical element array 2001. The optical element array 2002 is an optical component that forms an image with light from a predetermined reading area on pixels of the image sensor 11801. The reading area is a rectangular area on the original document platen 117. The optical element array 2002 focuses the light reflected from the original document on the original document platen 117 onto a pixel of the image sensor 11801. The optical element array 2002 will be described in more detail later.

The image sensor 11801 is a CCD image sensor, a CMOS image sensor, or other imaging devices. The image sensor 11801 is, for example, a line sensor in which pixels for converting light into an electric signal or an image signal are arranged in a line shape.

The illumination unit 11802 is a light source that irradiates the original document placed on the original document platen 117. The illumination unit 11802 includes a light source and a light guide body that guides light emitted from the light source and irradiates the original document surface. The light source is, for example, LED, organic EL, fluorescent tube, or the like. The light guide body guides the light emitted from the light source and irradiates an area including the reading area. The light guide body guides the light emitted from the light source towards the original document.

The light shielding body 11803 blocks light from the outside of the reading area, thereby preventing such light from being incident on the optical element array 2002. The light shielding body 11803 is, for example, a member whose surface is coated with a light shielding material.

The housing 11804 supports the image sensor 11801, the optical element array 2002, the illumination unit 11802, the light shielding body 11803, and the substrate 11805. The housing 11804 includes a light shielding member that blocks a part of the light emitted from the optical element array 2002. This light shielding member blocks light that otherwise would become stray light when light is incident on the image sensor 11801. The light shielding member also blocks light that is emitted from the optical element array 2002 but would not be incident on the image sensor 11801.

The substrate 11805 is a circuit substrate including a circuit that executes various processing related to image processing. The circuit is configured to read an image signal from the image sensor 11801. The circuit is further configured to perform signal processing on the image signal to acquire an image. The circuit includes a memory for temporarily storing the image.

Referring back to the description of FIG. 1, the original document feeder 119 is also referred to as, for example, an auto document feeder (ADF). The original document feeder 119 conveys the original documents placed on an original document tray one after another. The original document feeder 119 includes a roller, a motor, or the like for conveying the original document. An image of the conveyed original document is read by the scanner 102. In the above description, it is described that the reading module 118 moves along the sub-scanning direction Sa to read the image from the original document. However, when reading the original document using the original document feeder 119, the image forming apparatus 100 does not move the reading module 118 and instead conveys the original document in the sub-scanning direction Sa. As a result, the image forming apparatus 100 reads the image from the original document. The original document feeder 119 includes the back surface reading module 120.

The back surface reading module 120 reads an image from a back surface of the original document conveyed by the original document feeder 119. The back surface reading module 120 has, for example, the same configuration as that of the reading module 118. By using the reading module 118 and the back surface reading module 120, the image forming apparatus 100 can read the images from both sides of the original document conveyed by the original document feeder 119.

The operation panel 103 includes a man-machine interface or the like for receiving an input from an operator and outputting information for the operator. The operation panel 103 includes, for example, an input device such as a button (s) or the like, a touch panel, or the like.

Figure 4:
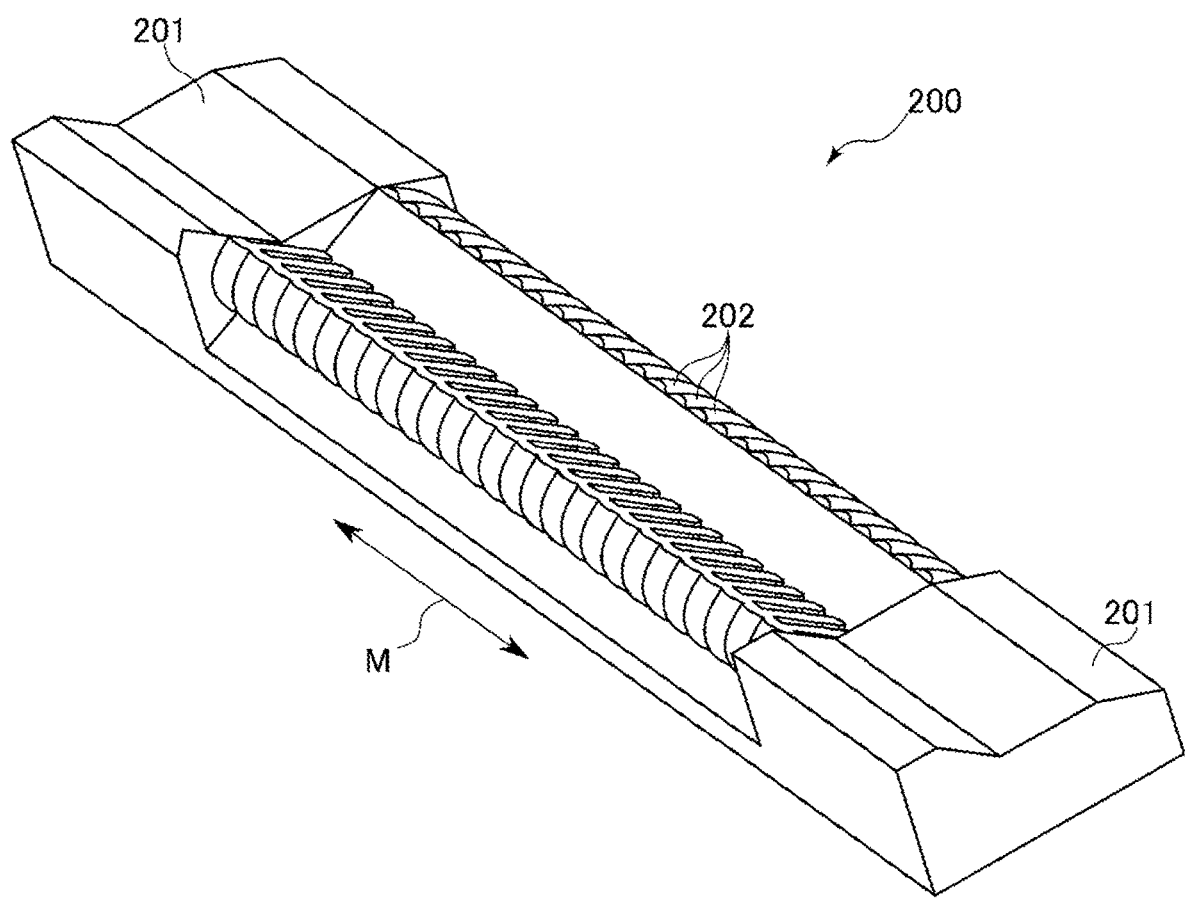
FIG. 4 is a perspective view illustrating an optical array.

The optical element array 2001 and the optical element array 2002 are collectively referred to as an optical array 200. FIG. 4 is a schematic perspective view illustrating the optical array 200. The main scanning direction Ma and the main scanning direction Mb are collectively referred to as a main scanning direction M in FIG. 4.

The optical array 200 is made of, for example, transparent resin. Alternatively, the optical array 200 may be made of transparent glass or the like. For example, the optical array 200 is formed integrally by injection molding, three-dimensional (3D) printing, or the like. Alternatively, the optical array 200 is formed by a plurality of portions that are connected to each other. A longitudinal direction of the optical array 200 is the main scanning direction M. In one embodiment, the optical array 200 includes two flange units 201 and a plurality of optical elements 202 as shown in FIG. 4.

The optical array 200 includes the two flange units 201. The flange units 201 are provided at opposite ends of the optical array 200 and sandwich the plurality of optical elements 202. The flange unit 201 can be used for mounting the optical array 200 or the like.

In the optical array 200, a plurality of optical elements 202 having the same shape are arranged along the main scanning direction M. Each optical element 202 has a function of forming an image of incident light as an image formation target. For example, the optical element 202 forms an image of the light emitted from the light source 10901 on the image surface on the photosensitive drum 10801. For example, the optical element 202 forms an image of the reflected light of the light emitted to the original document on the image sensor 11801.

Figure 5:
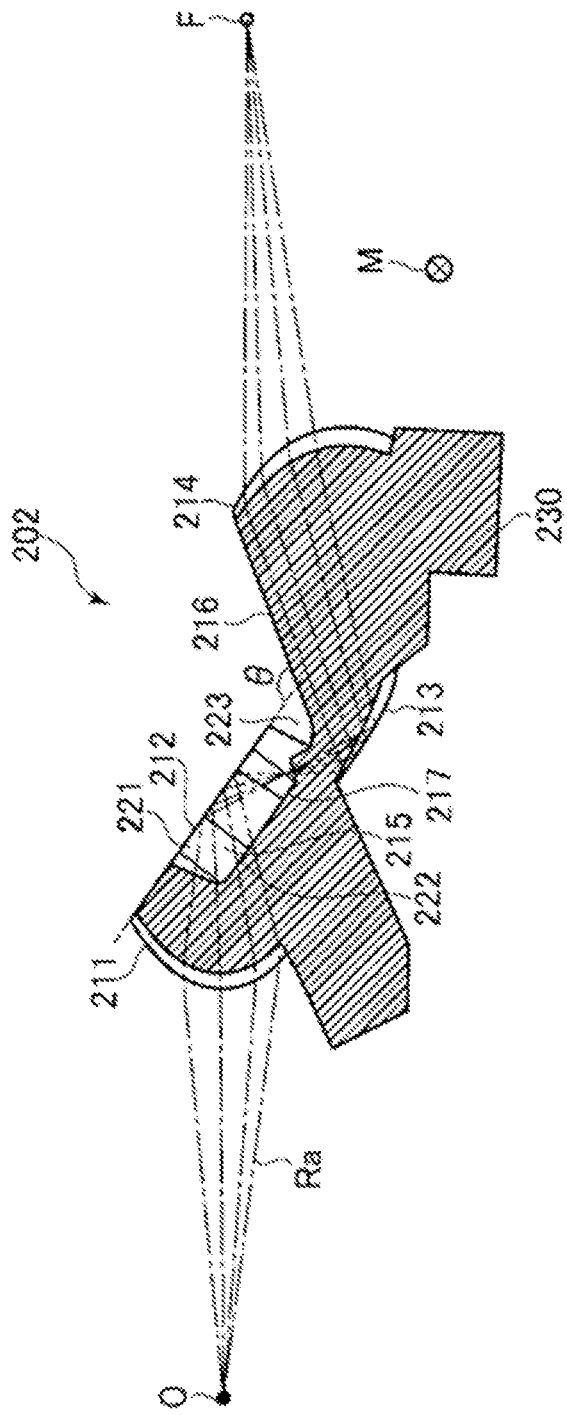
FIG. 5 is a plan view illustrating an optical element.

FIG. 5 is a cross-sectional diagram illustrating one optical element 202 of the optical array 200. FIG. 5 is a view of the optical element 202 from the side of the flange unit 201. The cut surface of the optical array 200 shown in FIG. 5 and the main scanning direction M are orthogonal to each other. FIG. 5 illustrates a trajectory of light incident on the optical array 200 from an object point O and converging on an image formation point F as a ray Ra. The optical element 202 is, for example, plane symmetric with respect to a plane of symmetry X that is perpendicular to the main scanning direction M. The optical element 202 includes a first lens surface 211, a first mirror surface 212, a second mirror surface 213, a second lens surface 214, a first light shielding surface 215, a second light shielding surface 216, a third light shielding surface 217, and a flange unit 230.

The first lens surface 211 is, for example, a convex surface whose surface protrudes outward from the optical array 200. A shape of the first lens surface 211 is, for example, a free curved surface shape which is plane symmetric with respect to the plane of symmetry X. Any point on the first lens surface 211 may or may not have the same two principal curvatures. The curvature of the first lens surface 211 may or may not be constant. The curvature of the first lens surface 211 may vary by a predetermined change amount. The first lens surface 211 may be a section of a spherical surface.

The first lens surface 211 functions as a lens. The light emitted from the light source 10901 is incident on the first lens surface 211. Alternatively, the light reflected by the original document is incident on the first lens surface 211. The incident light converges on the first lens surface 211, and the first lens surface 211 forms an intermediate inverted image.

The first mirror surface 212 is an upper surface of a first protruding portion 221 formed in a protruding shape.

The first mirror surface 212 is, for example, a flat surface. The first mirror surface 212 reflects the light incident from the first lens surface 211 by total internal reflection or Fresnel reflection. The light incident from the first lens surface 211 forms the intermediate inverted image after being reflected by the first mirror surface 212.

As described above, the first mirror surface 212 reflects the light incident through the first lens surface 211.

The second mirror surface 213 is formed on a side opposite to the first mirror surface 212 of the optical element 202. The second mirror surface 213 is formed, for example, in a rectangular shape and is formed to be curved inward. A shape of the second mirror surface 213 is, for example, a free curved surface shape which is plane symmetric with respect to the plane of symmetry X. Any point on the second mirror surface 213 may or may not have the same two principal curvatures. The curvature of the second mirror surface 213 may or may not be constant. The curvature of the second mirror surface 213 may vary by a predetermined change amount. The second mirror surface 213 may be a section of a spherical surface. The second mirror surface 213 may be a flat surface in some examples.

The second mirror surface 213 reflects light reflected by the first mirror surface 212 by total internal reflection or Fresnel reflection.

As described above, the second mirror surface 213 reflects the light reflected by the first mirror surface 212.

The second lens surface 214 is, for example, a convex surface whose surface protrudes outward from the optical array 200. A shape of the second lens surface 214 is, for example, a free curved surface shape which is plane symmetric with respect to the plane of symmetry X. Any point on the second lens surface 214 may or may not have the same two principal curvatures. The curvature of the second lens surface 214 may or may not be constant. The curvature of the second lens surface 214 may change by a predetermined change amount. The second lens surface 214 may be a section of a spherical surface.

The second lens surface 214 functions as a lens. The second lens surface 214 emits light reflected by the second mirror surface 213 to the outside of the optical array 200. The second lens surface 214 cooperates with the second mirror surface 213 to form an image which is an inverted image of the intermediate inverted image formed by the first lens surface 211. The light emitted from the second mirror surface 213 forms an image at the predetermined image formation point F. The image formation point F is a point on the image surface of the surface of the photosensitive drum 10801 or a point on the image sensor 11801.

As described above, the second lens surface 214 emits the light reflected by the second mirror surface 213.

Each of the first light shielding surface 215, the second light shielding surface 216, and the third light shielding surface 217 on the surface of the optical array 200 that includes a light shielding layer that blocks light. For example, a light shielding layer can be formed by hardening of a light shielding material applied to the surface of the optical array 200. That is, the first light shielding surface 215 and the second light shielding surface 216 can be formed by applying a light shielding material to the surface of the optical array 200. The light shielding material is, for example, an ink having a high light shielding property and including a polymer or the like having the same or almost the same refractive index as that of the optical array 200 as a base material. The light shielding material can be, for example, ultraviolet (UV) ink containing a light shielding material such as carbon black, pigment, dye, or the like. In this context, UV curable ink is ink that is hardened when irradiated with ultraviolet rays. In other examples, the light shielding material may be ink that is hardened by irradiation of light other than ultraviolet rays, radiation, or the like. Alternatively, the light shielding material may be ink that is hardened by other methods such as heating or the like.

The first light shielding surface 215 is between the third light shielding surface 217 and the first mirror surface 212. The first light shielding surface 215 is between the two flange units 201 and extends from one flange unit 201 to the other flange unit 201. The first light shielding surface 215 prevents the light emitted from the optical array 200 from being incident on the optical array 200 again without being reflected by the first mirror surface 212.

The second light shielding surface 216 is part of a side surface of the first protruding portion 221 whose upper bottom surface is the first mirror surface 212. The second light shielding surface 216 prevents the light in the optical array 200 from being reflected by the second light shielding surface 216. The second light shielding surface 216 prevents light inside the optical array 200 from being emitted to the outside of the optical array 200. The second light shielding surface 216 also prevents light from outside the optical array 200 from being transmitted into the optical array 200.

The third light shielding surface 217 includes a bottom surface of a groove (referred to as a first recessed portion 222) that is between the first protruding portions 221 of the adjacent optical elements 202. The third light shielding surface 217 extends between the first protruding portion 221 and the first light shielding surface 215 and from one flange unit 201 to the other flange unit 201. The third light shielding surface 217 has, for example, a step portion. The third light shielding surface 217 and the first light shielding surface 215 are connected in a V-shape.

A groove-shaped second recessed portion 223 is formed from a part of the first light shielding surface 215, a part of the second light shielding surface 216, and the third light shielding surface 217. Here, the part of the first light shielding surface 215 is a surface that is sandwiched between the first protruding portion 221, the first light shielding surface 215, and the flange unit 201 and extends from one flange unit 201 to the other flange unit 201. The part of the second light shielding surface 216 is a downstream side surface of the first protruding portion 221. The second recessed portion 223 is between the two flange units 201, and extends from one flange unit 201 to the other flange unit 201. It can be said that the first protruding portion 221 is formed on the third light shielding surface 217. The third light shielding surface 217 prevents the light inside the optical array 200 from being reflected. The third light shielding surface 217 also prevents the light inside the optical array 200 from being emitted to the outside of the optical array 200.

The flange unit 230 is used for mounting the optical array 200 or the like. The flange unit 230 also has a role of preventing stray light from reaching the image surface.

As described above, the light incident from the first lens surface 211 is reflected by the first mirror surface 212. However, a part of the light incident from the first lens surface 211 may be transmitted through the first mirror surface 212 without being reflected by the first mirror surface 212, and thus may be emitted to the outside of the optical array 200. The light having a sufficiently shallow incident angle to the first mirror surface 212 will be totally internally reflected due to the difference between a refractive index inside the optical array 200 and a refractive index outside the optical array 200. On the other hand, when the light is incident on the first mirror surface 212 at an incident angle at which the light is not totally internally reflected, a part of the light can be Fresnel-reflected, and a part of the light will be transmitted through the first mirror surface 212.

Figure 6:
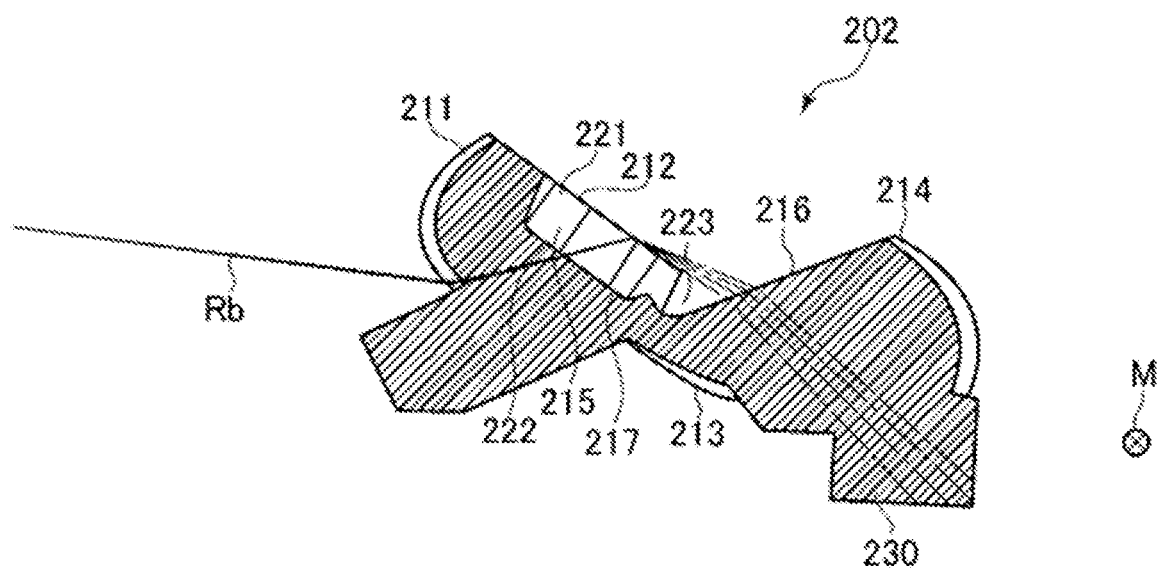
FIG. 6 is a plan view illustrating an optical element in which a light passes through a first mirror surface thereof.

FIG. 6 is a plan view illustrating the light transmitted through the first mirror surface 212. FIG. 6 illustrates a trajectory of the light, which is transmitted through the first mirror surface 212 without being reflected by the first mirror surface 212, as a light ray Rb. The light reflected by the first mirror surface 212 is not illustrated in FIG. 6.

The light transmitted through the first mirror surface 212 reaches the second light shielding surface 216. When the second light shielding surface 216 has sufficient light shielding performance, the light that hits the second light shielding surface 216 is not transmitted through the second light shielding surface 216 and does not enter the optical element 202. However, when the second light shielding surface 216 does not have the sufficient light shielding performance due to insufficient formation of the light shielding layer or the like, the light that hits the second light shielding surface 216 may be transmitted through the second light shielding surface 216. Particularly, when the optical array 200 has a seam, it is considered that the light is easily transmitted through the second light shielding surface 216 at the seam.

The light ray Rb shows the trajectory of stray light transmitted through such a second light shielding surface 216.

When the light ray Rb is transmitted through the second light shielding surface 216, the light ray Rb is refracted by the second light shielding surface 216 due to the difference between a refractive index outside the optical element 202 and a refractive index inside the optical element 202. The second light shielding surface 216 is formed at an angle so that all the light rays Rb transmitted through the second light shielding surface 216 and refracted are incident on the flange unit 230. Therefore, an advancing direction of the light ray Rb transmitted through the second light shielding surface 216 is different from that of the second lens surface 214.

FIG. 5 illustrates an angle between the first mirror surface 212 and the second light shielding surface 216 as an angle θ.

As described above, the second light shielding surface 216 refracts the light ray Rb so that the advancing direction of the light ray Rb is different from that of the second lens surface 214.

The light ray Rb transmitted through the second light shielding surface 216 is incident on the flange unit 230 except the scattered light ray. As described above, since the light ray Rb is incident on the flange unit 230 and is not incident on the image surface, the image formation of the optical array 200 is not affected. However, a subsequent trajectory of the light incident on the flange unit 230 can be ignored here because it is considered that there is no influence of the subsequent trajectory thereof on the image formation or the influence thereof is small enough to be ignored.

Figure 7:
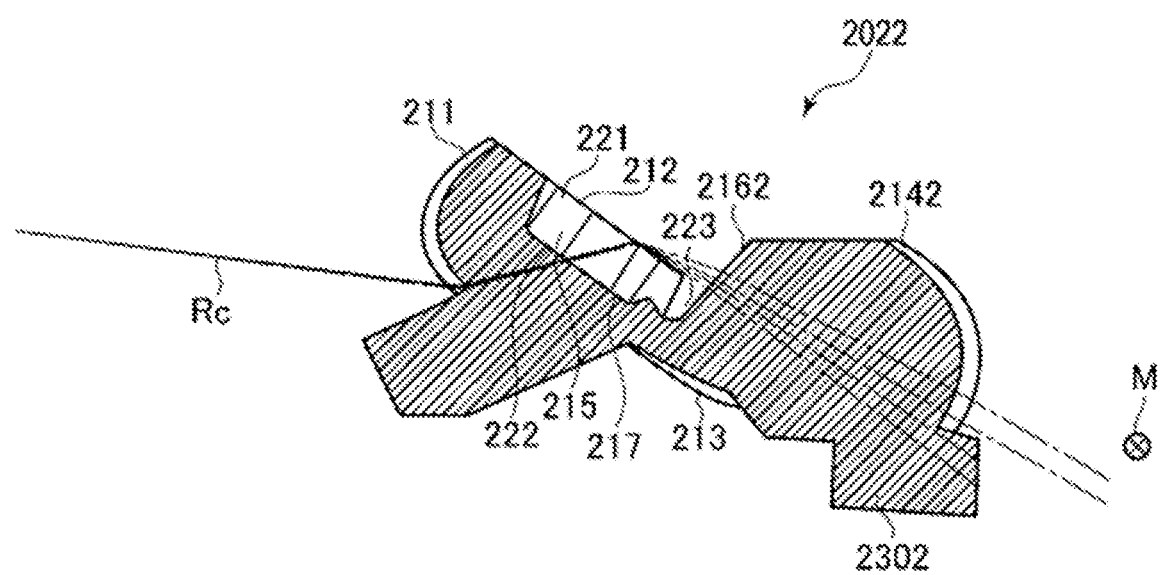
FIG. 7 is a plan view illustrating a comparative example of an optical element in which a light passes through a first mirror surface thereof.

On the other hand, in a comparative example of an optical array, the stray light may be incident on the image surface and may affect the image formation of the optical array. FIG. 7 is a plan view illustrating light transmitted through the first mirror surface 212 of such a comparative example of an optical element 2022. FIG. 7 illustrates a trajectory of the light transmitted through the first mirror surface 212 without being reflected by the first mirror surface 212 as a light ray Rc. The light reflected by the first mirror surface 212 is not illustrated in FIG. 7.

As an example, the optical element 2022 includes the first lens surface 211, the first mirror surface 212, the second mirror surface 213, a second lens surface 2142, and the first light shielding surface 215, a second light shielding surface 2162, the third light shielding surface 217, and a flange unit 2302.

The angle between the first mirror surface 212 and the second light shielding surface 2162 is smaller than the angle θ between the first mirror surface 212 and the second light shielding surface 216. The size of the second lens surface 2142 is larger than that of the second lens surface 214. The flange unit 2302 is smaller than the flange unit 230.

At least a part of the light ray Rc transmitted through the second light shielding surface 2162 is incident on the second lens surface 214. The light incident on the second lens surface 214 may be incident on the image surface. The incident light on the image surface may affect the image formation of the optical array 200.

Figure 8:
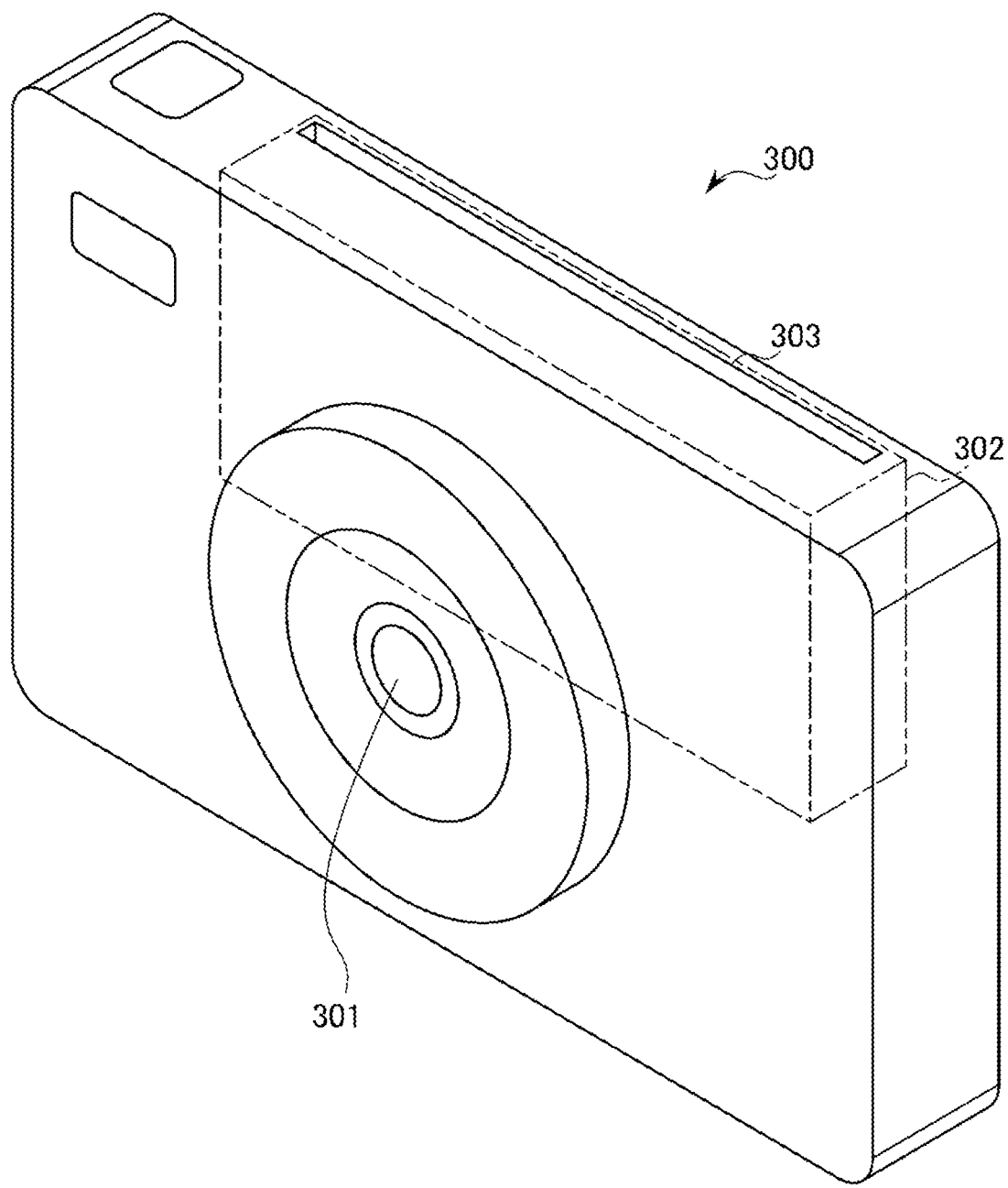
FIG. 8 is a schematic perspective view illustrating an instant camera according to an embodiment.

Here, an instant camera, which is another embodiment of an image forming apparatus, will be described with reference to FIG. 8. FIG. 8 is a schematic perspective view illustrating an instant camera 300 according to an embodiment. The instant camera 300 includes an imaging unit 301 and a printer 302. A slit 303 is opened in the instant camera 300.

The imaging unit 301 is, for example, an optical system for a digital camera, including a lens or the like and an image sensor or the like. The imaging unit 301 captures an image of an object and outputs image data. The image data is inputted to the printer 302 and printed. The image data may be subjected to various image processing before the printing by the printer 302 is performed. The image data may be inputted to the printer 302 after being temporarily stored in a storage apparatus such as a memory or the like.

The printer 302 will be described with reference to FIG. 9. FIG. 9 is a schematic view illustrating the printer 302. The printer 302 forms an image based upon the image data outputted by the imaging unit 301 on a photosensitive medium 304.

The photosensitive medium 304 is, for example, a silver halide photographic film, an instant film, or the like.

The printer 302 includes a conveyance mechanism for conveying the photosensitive medium 304 in an arrow direction illustrated in FIG. 9 parallel to the X direction). The photosensitive medium 304 is conveyed along a flat conveyance surface 3001 on the XZ plane by the conveyance mechanism. The photosensitive medium 304 includes an accommodating unit 305 for accommodating a developer on a tip side in a conveyance direction. A pair of pressing rollers 306 and 307 for sandwiching and pressing the photosensitive medium 304 to break and seal the accommodating unit 305 are provided on a conveyance path of the photosensitive medium 304. The pressing roller 306 and the pressing roller 307 have a length exceeding a width in the Z direction orthogonal to the conveyance direction of the photosensitive medium 304.

The photosensitive medium 304 is conveyed through between the pressing roller 306 and the pressing roller 307. At least one of the pressing roller 306 and the pressing roller 307 is biased towards the other. Therefore, the photosensitive medium 304 conveyed through between the pressing roller 306 and the pressing roller 307 is conveyed while being compressed by the pressing roller 306 and the pressing roller 307. As a result, the accommodating unit 305 of the photosensitive medium 304 is compressed and broken, and a developer is supplied to the photosensitive medium 304 from the accommodating unit 305. By further conveying the photosensitive medium 304, the developer is spread over the whole surface of the photosensitive medium 304. As a result, a color latent image of the photosensitive medium 304 is developed and a color image is formed on the photosensitive medium 304. The photosensitive medium 304 conveyed by the pressing roller 306 and the pressing roller 307 is discharged from the slit 303 illustrated in FIG. 9.

An exposure apparatus 310 is separated away from the photosensitive medium 304 opposite the conveyance path for conveying the photosensitive medium 304. The exposure apparatus 310 irradiates a light receiving surface 3041 of the photosensitive medium 304 conveyed via the conveyance path with exposure light of three colors (e.g., red, green, and blue (RGB)) in which the inputted image data is color-separated, thereby forming the color latent image on the photosensitive medium 304. The exposure apparatus 310 is arranged on an upstream side of the pressing roller 306 and the pressing roller 307 along the conveyance path.

As an example, the exposure apparatus 310 includes a support 311, a light source 312, a protective glass 313, a sealing plate 314, a transparent glass 315, a slit 316, an adhesive 317, a flexible substrate 318, and an optical array 2003. The exposure apparatus 310 forms an image on the photosensitive medium 304.

The support 311 extends along a width direction (the Z direction in the figure) orthogonal to the conveyance direction of the photosensitive medium 304. The support 311 supports the optical array 2003 having a structure that can be substantially similar to that of the optical array 200 described above. The optical array 2003 extends along the Z direction, reflects and condenses light incident from the light source 312, and emits the light toward the light receiving surface 3041 of the photosensitive medium 304.

As an example, the exposure apparatus 310 includes the light source 312 of three colors of RGB. The light source 312 is an OLED, an LED, or the like.

The light source 312 is shielded from the outside air by the adhesive 317 that is applied to the transparent glass 315, the sealing plate 314, and an outer periphery of the sealing plate 314 and is provided in a frame shape that seals a space between the transparent glass 315 and the sealing plate 314 so as not to absorb moisture. The light source 312 is connected to the flexible substrate 318 and is fed from a circuit on the flexible substrate 318. The support 311 supports the transparent glass 315 between the optical array 2003 and the light source 312.

The support 311 supports the transparent protective glass 313 on a side of the photosensitive medium 304 of the optical array 2003. The protective glass 313 protects the optical array 2003 and prevents dust from adhering to the optical array 2003. The protective glass 313 is positioned by abutting on one end of the optical array 2003.

The support 311 includes the slit 316 extending along the Z direction on a light emitting side of the protective glass 313. The slit 316 has a width for allowing a light component necessary for exposure to pass, and shields noise light unnecessary for exposure.

The above-described embodiments can be modified in various ways.

In some examples, the printer 302 may not necessarily be built within the instant camera 300. In such a case, the printer 302 may acquire image data from an external device such as a smartphone, a PC, a digital camera, or the like that is connected by wire or wirelessly, or otherwise a removable storage medium such as a memory card, a universal serial bus (USB) memory, or the like. The printer 302 then prints an image on the photosensitive medium 304 based upon the supplied image data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical array, comprising:
    one or more optical elements each including:
        an incident surface at which light can enter into the optical element;
        a protruding portion including an upper surface that includes a first reflection surface at which the light passing through the incident surface is reflected;
        a second reflection surface at which the light reflected from the first reflection surface is reflected again;

an emission surface at which the light reflected from the second reflection surface exits the optical element; and a refractive surface at which light passing through the first reflection surface from inside the optical element is refracted in a direction away from the emission surface.

2. The optical array according to claim 1, wherein each of the optical elements further includes a flange, and the light that passes through the first reflection surface is refracted by the refractive surface towards the flange.

3. The optical array according to claim 1, wherein the refractive surface includes a light shielding layer and refracts the light passing through the light shielding layer away from the emission surface.

4. The optical array according to claim 1, wherein the incident surface has a shape of a lens that converges the light incident on the optical element at the incident surface.

5. The optical array according to claim 1, wherein the emission surface has a shape of a lens that focuses the light reflected by the second reflection surface.

6. The optical array according to claim 1, wherein the upper surface of the protruding portion of each of the optical elements is connected to form a continuous surface.

7. The optical array according to claim 1, wherein the upper surface of the protruding portion and the refractive surface form a predetermined angle.

8. The optical array according to claim 1, wherein the incident surface, the first reflection surface, the second reflection surface, the emission surface, and the refractive surfaces are outer surfaces of the optical elements.

9. The optical array according to claim 1, further comprising:

a pair of flanges between which the optical elements are arranged along a line.

10. An optical apparatus, comprising:

a light source configured to emit light; and one or more optical elements each including:

an incident surface at which light can enter into the optical element;

a protruding portion including an upper surface that includes a first reflection surface at which the light passing through the incident surface is reflected;

a second reflection surface at which the light reflected from the first reflection surface is reflected again;

an emission surface at which the light reflected from the second reflection surface exits the optical element; and a refractive surface at which light passing through the first reflection surface from inside the optical element is refracted in a direction away from the emission surface.

11. The optical apparatus according to claim 10, wherein each of the optical elements further includes a flange, and the light that passes through the first reflection surface is refracted by the refractive surface towards the flange.

12. The optical apparatus according to claim 10, wherein the refractive surface includes a light shielding layer and refracts the light passing through the light shielding layer away from the emission surface.

13. The optical apparatus according to claim 10, wherein the incident surface has a shape of a lens that converges the light incident into the optical element at the incident surface.

14. The optical apparatus according to claim 10, wherein the emission surface has a shape of a lens that focuses the light reflected by the second reflection surface.

15. An image forming apparatus, comprising:

a light source configured to emit light;

one or more optical elements each including:

an incident surface at which light can enter into the optical element;

a first reflection surface at which the light passing through the incident surface is reflected;

a second reflection surface at which the light reflected from the first reflection surface is reflected again;

an emission surface at which the light reflected from the second reflection surface exits the optical element; and a refractive surface at which light passing through the first reflection surface from inside the optical element is refracted in a direction away from the emission surface; and an image forming unit configured to form a latent image according to the light emitted from the emission surface.

16. The image forming apparatus according to claim 15, further comprising:

a photosensitive drum on which the latent image is formed.

17. The image forming apparatus according to claim 15, further comprising:

a roller configured to convey a photosensitive medium on which the latent image is formed.

18. The image forming apparatus according to claim 17, further comprising:

a housing having a slot through which the photosensitive medium is ejected.

19. The image forming apparatus according to claim 18, wherein the image forming apparatus is a camera.

* * * * *